United States Patent [19]

Gueguen et al.

[11] Patent Number: 5,593,462
[45] Date of Patent: Jan. 14, 1997

[54] METHOD OF MANUFACTURING A MULTILAYER ELECTROCHEMICAL ASSEMBLY COMPRISING AN ELECTROLYTE BETWEEN TWO ELECTRODES, AND AN ASSEMBLY MADE THEREBY

[75] Inventors: Michel Gueguen, Fouesnant; Marc Billion, Guidel Plage; Hervé Majastre, Quimper, all of France

[73] Assignee: Bollore Technologies, France

[21] Appl. No.: 339,017

[22] Filed: Nov. 14, 1994

[30] Foreign Application Priority Data

Nov. 16, 1993 [FR] France .................. 93 13635

[51] Int. Cl.⁶ .................................................. H01M 4/04
[52] U.S. Cl. .................. 29/623.3; 264/177.13; 427/80; 427/284; 427/296; 429/94; 29/623.5
[58] Field of Search ........................ 29/623.3, 623.5; 427/80, 116, 284, 296; 429/94; 264/177.13

[56] References Cited

U.S. PATENT DOCUMENTS

| | | | |
|---|---|---|---|
| 2,280,789 | 4/1942 | Brennan | 427/80 X |
| 3,429,747 | 2/1969 | Deseniss | 429/94 |
| 3,434,203 | 3/1969 | Thorp | 427/284 X |
| 4,281,492 | 8/1981 | Schock et al. | 264/177.13 X |
| 4,605,527 | 8/1986 | Kamiura et al. | 264/177.13 X |
| 4,783,384 | 11/1988 | Van Beek et al. | 429/94 X |
| 5,132,070 | 7/1992 | Paul et al. | 264/177.13 X |
| 5,219,673 | 6/1993 | Kaun | 29/623.3 X |
| 5,442,197 | 8/1995 | Andrieu et al. | 427/80 X |
| 5,445,906 | 8/1995 | Hobson et al. | 29/623.3 X |

FOREIGN PATENT DOCUMENTS 0145498  12/1983  European Pat. Off. ....... H01M 6/18

*Primary Examiner*—Stephen Kalafut
*Attorney, Agent, or Firm*—Blakely Sokoloff Taylor & Zafman

[57] ABSTRACT

The present invention relates to a method of manufacturing a multilayer electrochemical assembly comprising steps consisting in co-extruding an element comprising at least one electrode film and an electrolyte film based on an ionic conductor polymer through a die so that the electrode is accessible over at least one main face of the extruded element, and over not more than one edge of said element, spiral winding a complex based on the above-specified extruded element to form a structure having, on different faces of its edges, means for making electrical contact respectively with each of the two electrodes, and metallizing said faces of the edge of the structure.

47 Claims, 9 Drawing Sheets

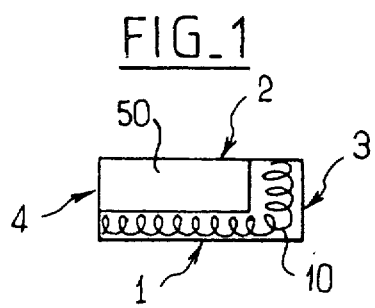
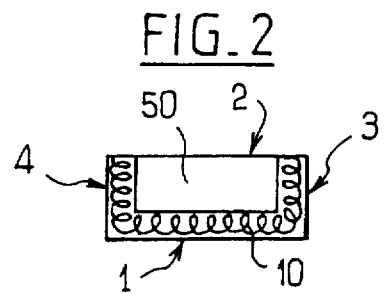
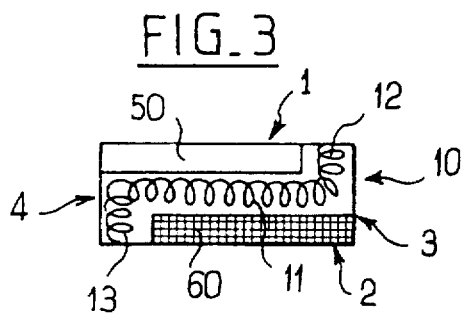
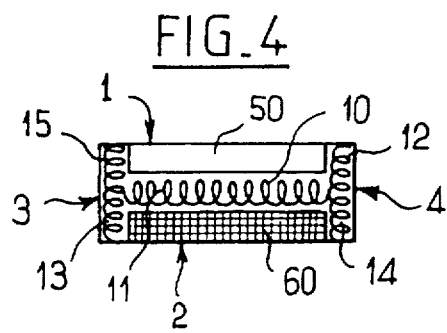
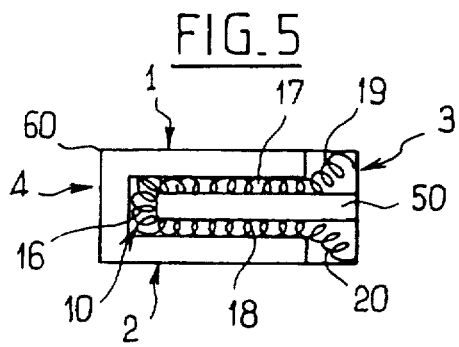
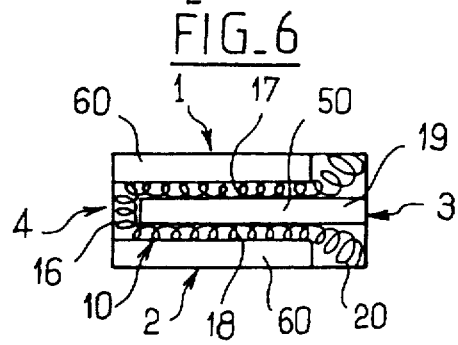
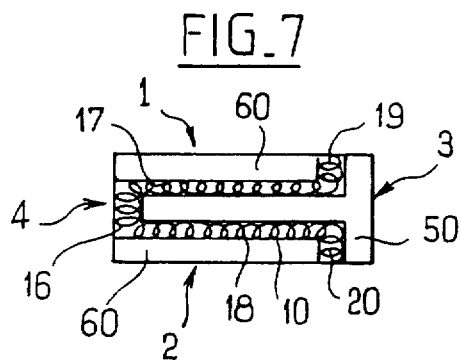
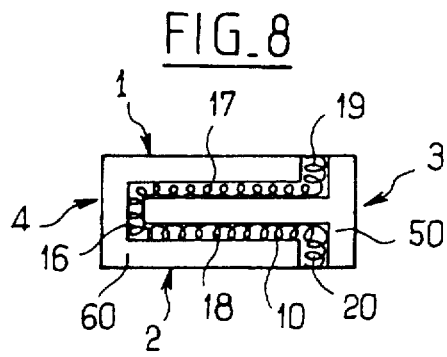
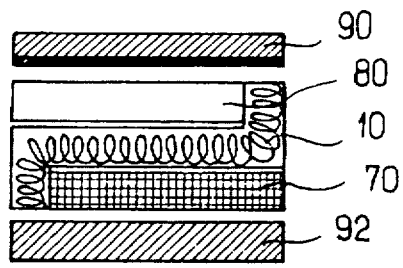

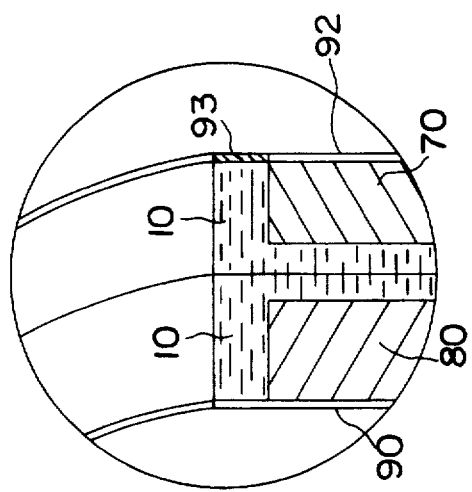
FIG._11A
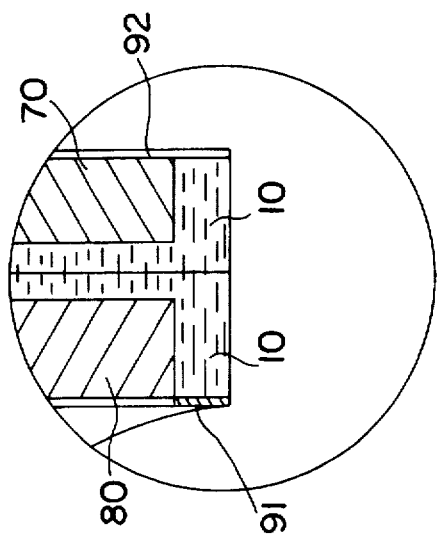
FIG._11B
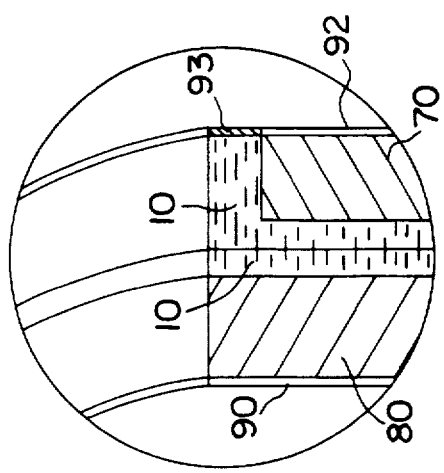
FIG._12A
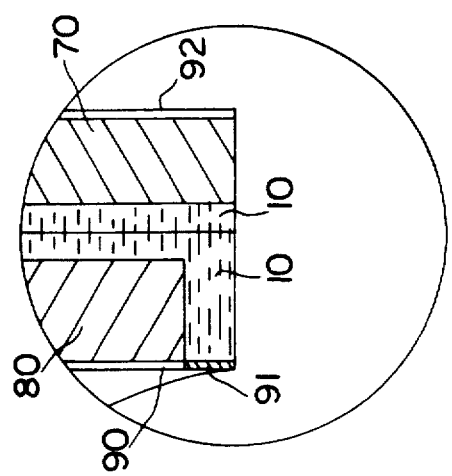
FIG._12B

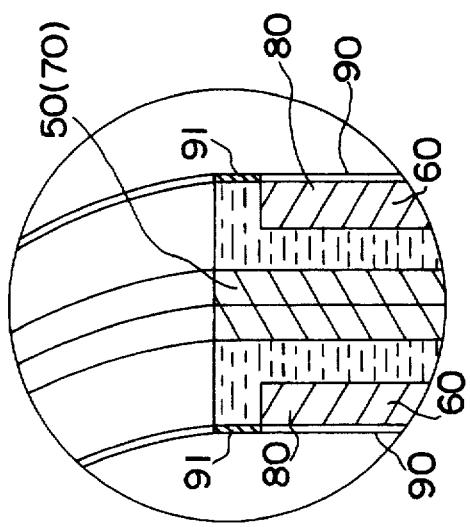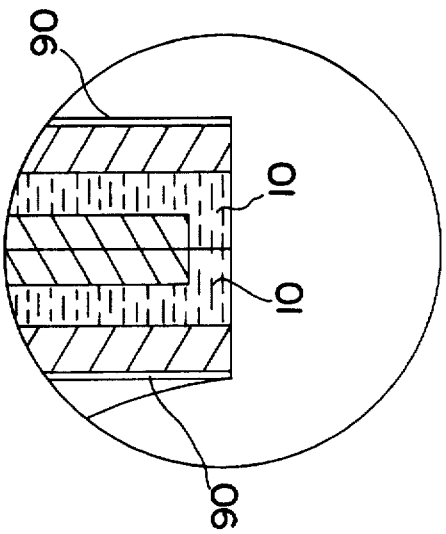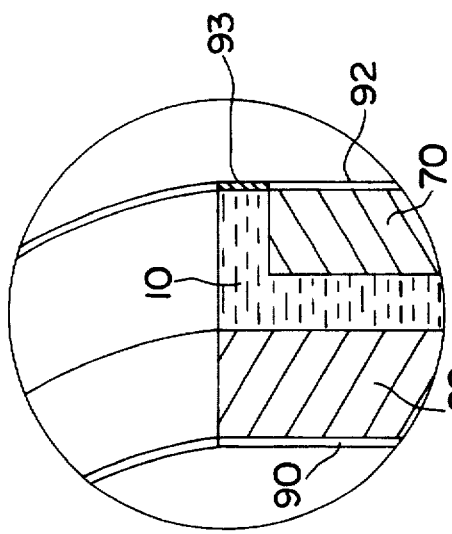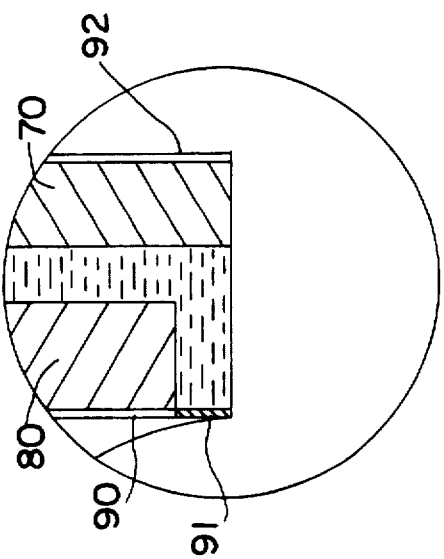

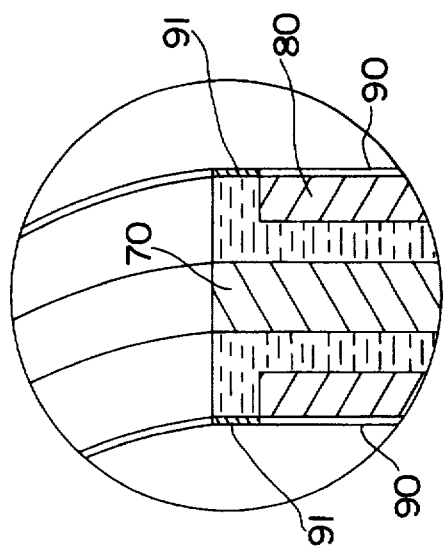
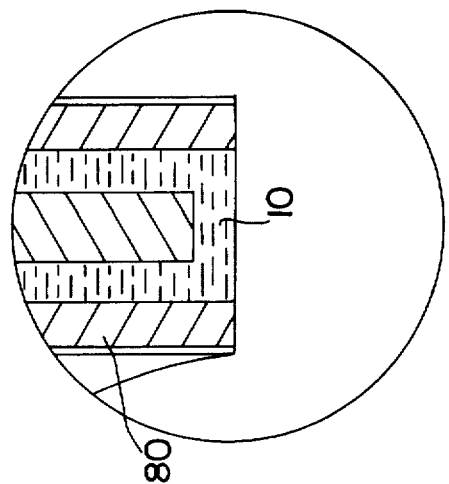
FIG. 16A
FIG. 16B
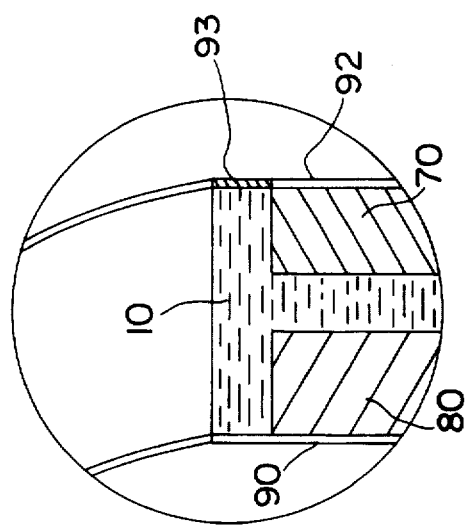
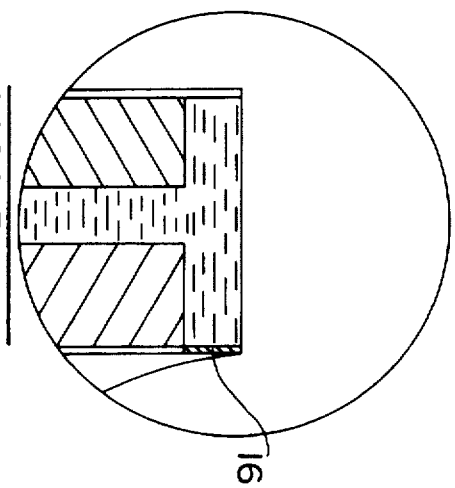
FIG. 15A
FIG. 15B

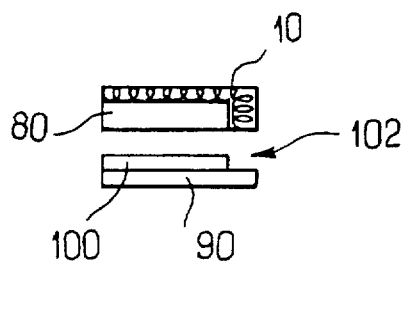
FIG_18A
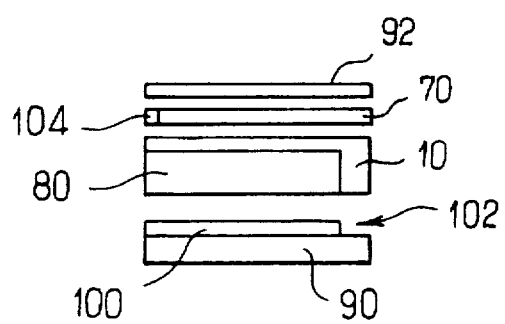
FIG_18B
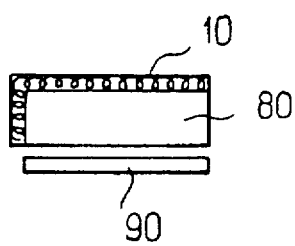
FIG_19A
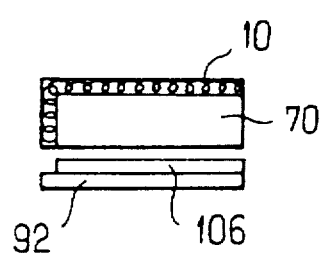
FIG_19B
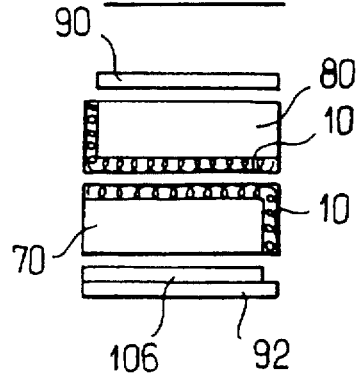
FIG_19C
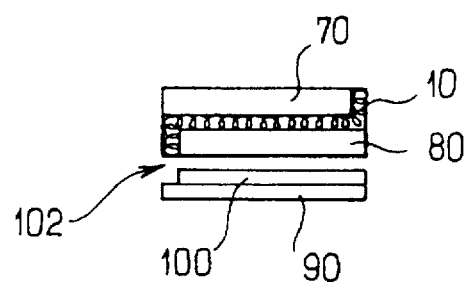
FIG_20

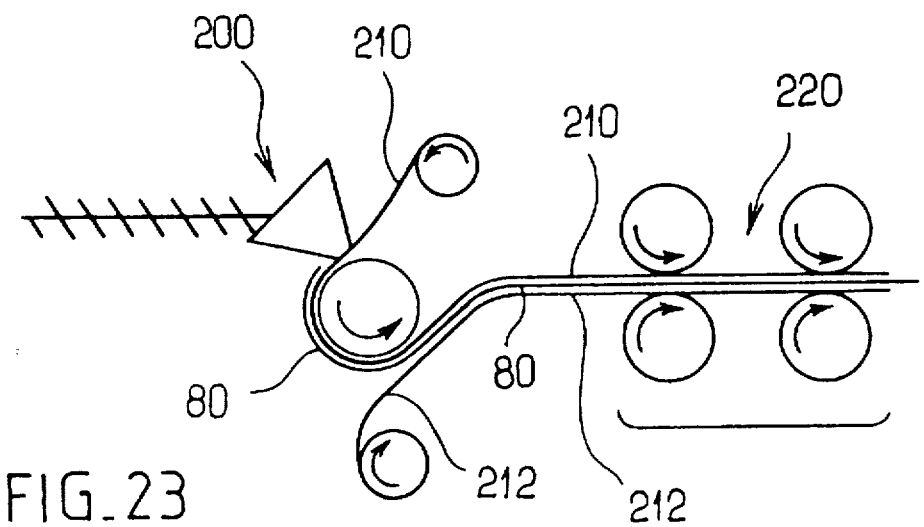
FIG_23
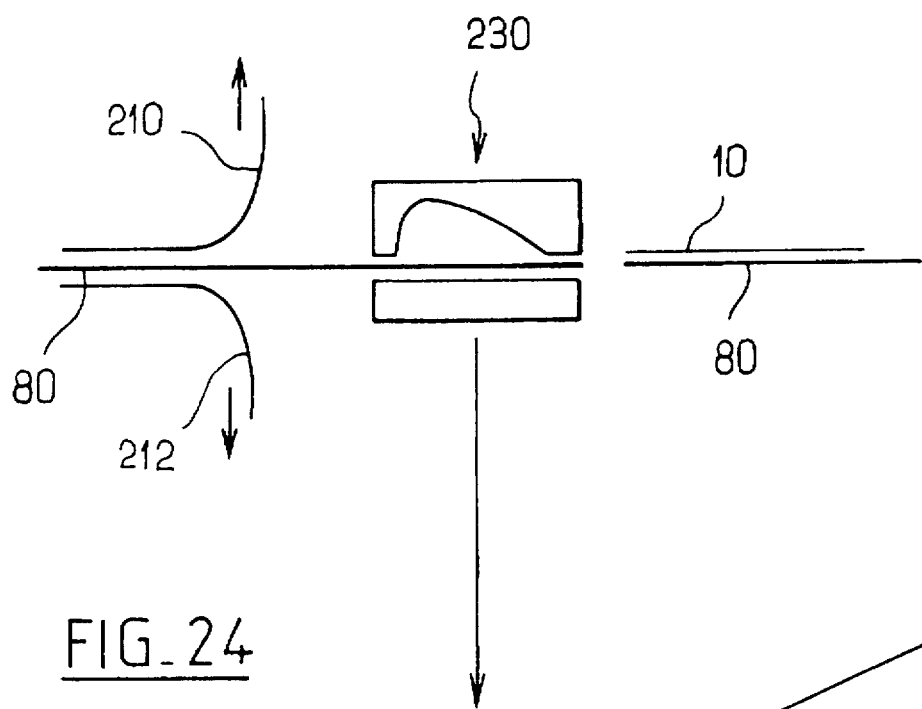
FIG_24
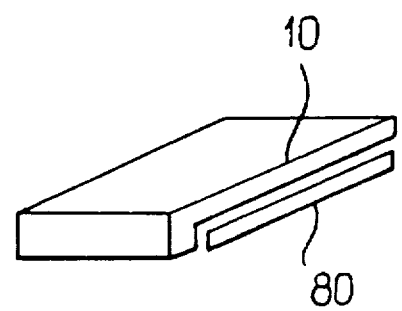
FIG_25

METHOD OF MANUFACTURING A MULTILAYER ELECTROCHEMICAL ASSEMBLY COMPRISING AN ELECTROLYTE BETWEEN TWO ELECTRODES, AND AN ASSEMBLY MADE THEREBY

FIELD OF THE INVENTION

The present invention relates to the field of manufacturing multilayer electrochemical assemblies of the kind comprising an electrolyte sandwiched between two electrodes.

A particular application of the present invention lies in making assemblies for storing electrical energy, in particular electrical cells organized as rechargeable batteries, or as non-rechargeable batteries, or indeed as supercapacitors.

More precisely, the present invention relates to the field of electrochemical assemblies including an ionic conductor polymer electrolyte.

BACKGROUND OF THE INVENTION

Such electrochemical assemblies have given rise to a vast amount of research and to abundant literature.

Numerous documents relate to preparing the main components of such assemblies. For example, document FR-A-2 616 971 describes the preparation of a lithium or a lithium alloy anode by spiral winding, whereas documents EP-A-0 285 476 and EP-A-0 357 859 describe the preparation of such an anode by deposition in the molten state. Documents FR-A-2 442 512, FR-A-2 523 769, FR-A-2 542 322, FR-A-2 557 735, FR-A-2 606 216, and U.S. Pat. No. 4,620,944 describe various electrolyte formulations. Document FR-A-2 563 382 describes various formulations of cathode materials based on $V_2O_5$ and on metal oxides and sulfides.

Other documents relate to the technology for manufacturing such assemblies. Most such documents, see for example FR-A-2 616 969 and FR-A-2 616 970, propose preparing each layer making up the electrochemical assembly in steps, making use of solvents, and possibly also of final cross-linking. Document EP-A-0 145 498 envisages making the polymer electrolyte by extrusion or co-extrusion on another component of the assembly.

In spite of the above research and literature, no such assembly is industrially available at the present time.

OBJECTS AND SUMMARY OF THE INVENTION

Consequently, an object of the present invention is to improve the theoretical concepts that have been proposed in the past so as to enable multilayer assemblies having a polymer electrolyte to be used industrially.

In the context of the present invention, this object is achieved by means of a method which comprises the following steps:

extruding an element comprising at least one electrode film and an electrolyte film based on an ionic conductor polymer, the extrusion being through a die shaped in such a manner that the electrode is accessible from at least one main face of the extruded element and from no more than one of the edges of said element;

spiral winding a complex based on the above-specified extruded element, the complex comprising the electrolyte layer plus two electrodes such as a cathode and an anode, disposed on respective opposite sides of the electrolyte, to form a structure having, on different edge faces thereof, means for making electrical contact with respective ones of the two electrodes; and metallizing said edge faces of the structure.

BRIEF DESCRIPTION OF THE DRAWINGS

Other characteristics and objects and advantages of the present invention appear on reading the following detailed description of non-limiting examples, given with reference to the accompanying drawings, in which:

FIGS. 1 to 8 are cross-section views through various elements obtained by co-extrusion for the purpose of implementing a multilayer electrochemical assembly of the present invention;

FIG. 9 is a diagram showing the composition of a multilayer electrochemical assembly of the present invention;

FIGS. 11a and 11b, 12a and 12b, 13a and 13b, 14a and 14b, 15a and 15b, 16a and 16b and 17a and 17b are fragmentary views in cross-section through various differing component elements in an electrochemical assembly of the present invention;

FIGS. 18A and 18B show two intermediate steps in the manufacture of an assembly in a first example of the invention;

FIGS. 19A, 19B, and 19C show three intermediate steps in the manufacture of an assembly in a second example of the invention;

FIG. 20 shows an intermediate step in the manufacture of an assembly in a third example of the invention;

FIGS. 23 and 24 are diagrams showing two main steps in a variant implementation of the invention; and FIG. 25 is a diagrammatic section view through an assembly obtained at the outlet from a die for extruding electrolyte on an electrode in the context of the variant shown in FIGS. 23 and 24.

MORE DETAILED DESCRIPTION

Figure 10:
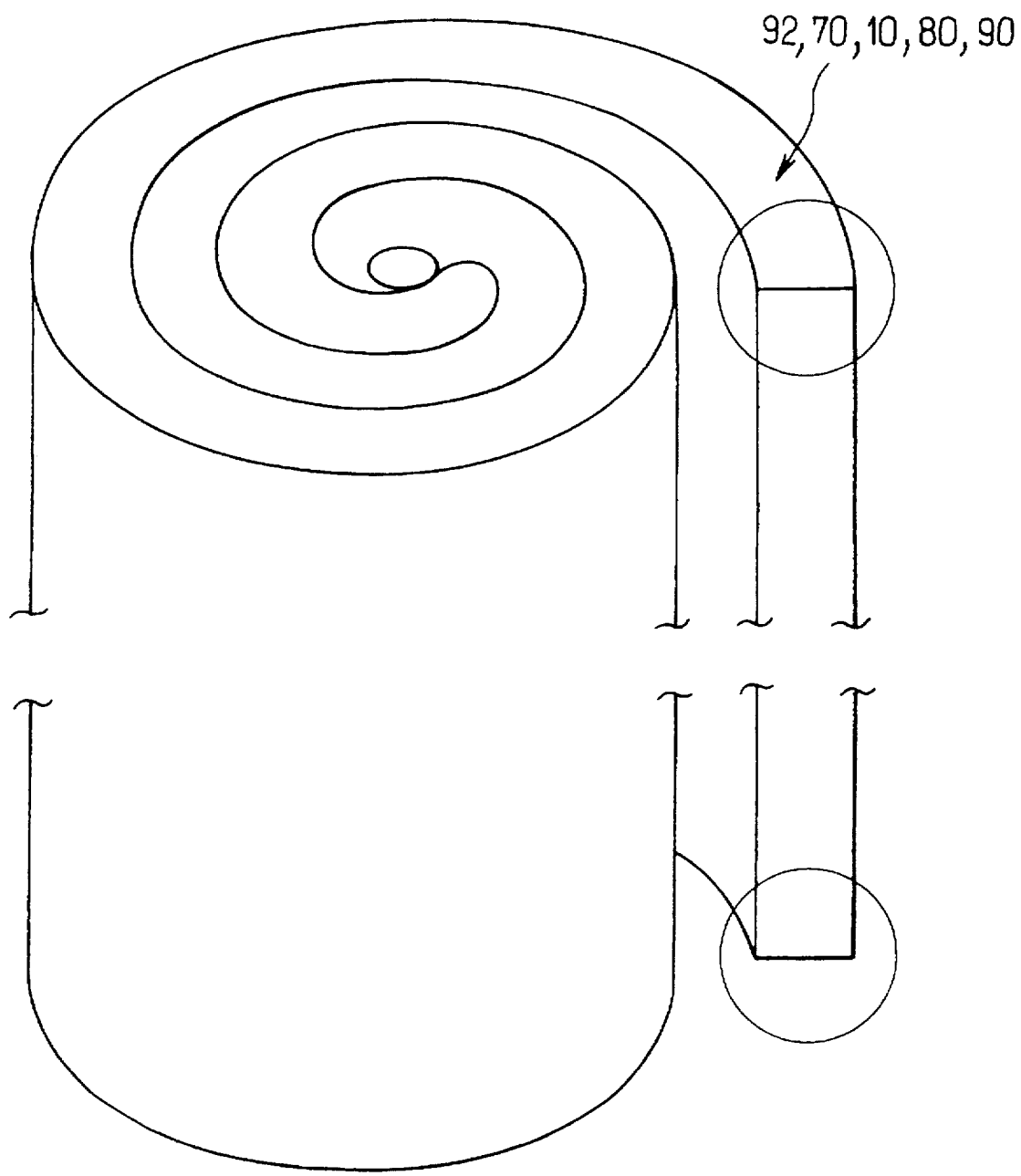
FIG. 10 is a diagram showing an electrochemical assembly of the present invention.

As mentioned above, the method of the present invention consists essentially in:

extruding an element comprising an electrolyte film based on an ionic conductor polymer and at least one electrode film;

winding a complex based on the above-specified extruded element, comprising the electrolyte layer and two electrodes such as a cathode and an anode disposed respectively on opposite sides of the electrolyte, in the form of a structure having respective electrical contacts on each of different edge faces for connection with the two electrodes; and metallizing said faces of the edge of the structure.

Each of the steps in this method is described below.

The extrusion step may consist in bi-extrusion of an electrode film on a film of electrolyte, or of tri-extrusion of two electrode films on an electrolyte film. It is preferably constituted by co-extrusion of at least one electrode film on the electrolyte film.

In the context of the present invention, the electrolyte film of ionic conductor polymer preferably comprises a layer of polymer material associated with a lithium salt. The lithium salt may be associated with the polymer material by mixing or by grafting. It is preferably mixed with a wax acting as a sliding agent, a flame retarding agent, a charge dispersion agent, and/or an agent that facilitates extrusion. The wax must be electrochemically inert relative to the other components of the assembly. Thus, the electrolyte film preferably comprises a few percent by weight of wax. For example, the wax may be selected from the group of polyolefins, such as an amorphous propylene-ethylene terpolymer or a polyethylene having very low viscosity, or indeed an amide.

Such wax is considered as being highly preferred. However it would be possible to envisage making embodiments having no wax.

Accompanying FIGS. 1 and 2 show two configurations obtained by bi-extrusion of an electrolyte film and an adjacent electrode film constituting an anode or a cathode.

Accompanying FIGS. 3 to 8 show six configurations obtained by tri-extrusion of the electrolyte film between an anode film and a cathode film.

In all of the variants shown in FIGS. 1 to 8, the sheet obtained at the end of the extrusion process is of constant thickness across its entire width. The two main faces of the sheet are given references 1 and 2. Its side edges are referenced 3 and 4.

More precisely, the step of co-extruding the electrolyte film and at least one electrode film is implemented through a die shaped in such a manner that the electrode is accessible on at least one main face of the extruded element and also on an edge of said element.

In the configuration of FIG. 1, the electrolyte 10 has an L-shaped profile. More particularly, the electrolyte 10 occupies one of the main faces 1 of the sheet in full and also occupies one of the two edges 3 thereof in full. The co-extruded electrode 50 may be an anode or a cathode. It is accessible over a fraction of the second main face 2, and over a fraction of the second edge 4 of the sheet.

In the configuration of FIG. 2, the electrolyte 10 has a U-shaped profile. More particularly, the electrolyte 10 covers one of the main faces 1 of the sheet in full and also covers both of its edges 3 and 4 in full. The co-extruded electrode 50 may be an anode or a cathode. It is accessible over a fraction of the second main face 2.

In the configuration of FIG. 3, the electrolyte 10 comprises an internal core 11 which extends over the entire width of the extruded sheet and which possesses extensions 12 and 13 at its respective ends that cover each of the respective edges 3 and 4 in part, with each extension 12 or 13 extending to a respective one of the main faces 1 or 2. The anode and cathode layers 50 and 60 are disposed on respective opposite sides of the internal core 11 and are respectively accessible over a fraction of each of the first and second main faces 1 and 2, and also of a fraction of the respective edges 3 and 4.

In the configuration of FIG. 4, the electrolyte has an H-shaped profile. More precisely, the electrolyte 10 comprises an internal core 11 which extends over the entire width of the extruded sheet and which possesses extensions 12, 13, 14, and 15 at its respective ends that occupy the respective edges 3 and 4 in full, each extending to one of the main faces 2 and 1. The anode and cathode layers 50 and 60 are disposed on respective opposite sides of the internal core 11 and they are accessible via respective fractions of the first and second main faces 1 and 2.

In the configuration of FIG. 5, the electrolyte 10 has a generally U-shaped profile. More precisely, the electrolyte 10 comprises a core 16 which extends perpendicularly to the two main faces 1 and 2, plus two mutually parallel branches 17 and 18 that are also parallel to the main faces 1 and 2. The core 16 is thus parallel to the edge 4. It is close thereto, but set back therefrom. Similarly, the two branches 17 and 18 are set back from the main faces 1 and 2 respectively. The free ends of the branches 17 and 18 distant from the core 16 are accessible at the second edge 3. In addition, the free ends of the branches 17 and 18 are provided with outwardly-directed extensions 19 and 20 that are accessible both from the edge 3 and from respective ones of the main faces 1 and 2. One of the two electrodes 50, an anode or a cathode, is placed inside the volume defined by the two branches 17 and 18. Consequently, it is accessible from the edge 3. The other electrode 60 is placed on the outsides of the branches 17 and 18 and of the core 16. It is accessible simultaneously from both main faces 1 and 2, and from the edge 4.

In the configuration of FIG. 6, the electrolyte 10 has a U-shaped profile similar to that of FIG. 5. The only difference between FIGS. 6 and 5 lies in the fact that in FIG. 6, the core 16 opens out to the edge 4, and consequently the second electrolyte 60 is made up of two separate elements that are accessible from respective ones of the main faces 1 and 2.

In the configuration of FIG. 7, the electrolyte 10 has a U-shaped profile similar to FIGS. 5 and 6. The only difference between FIGS. 7 and 6 lies in the fact that in FIG. 7 the extensions 19 and 20 provided on the branches 17 and 18 of the electrolyte do not open out to the edge 3. These extensions 19 and 20 open out solely to the main faces 1 and 2. Consequently, the first electrode 50 provided between the branches 17 and 18 is accessible over the entire edge 3 and also over adjacent portions of the main faces 1 and 2. The second electrode 60 continues to be formed by two separate elements that are accessible from the main faces 1 and 2 respectively.

In the configuration of FIG. 8, the electrolyte 10 has a U-shaped profile comparable to FIGS. 5, 6, and 7. The only difference between FIGS. 8 and 5 lies in the fact that in FIG. 8, the extensions 19 and 20 provided on the branches 17 and 18 of the electrolyte do not open out to the edge 3. These extensions 19 and 20 open out solely to the main faces 1 and 2. Consequently, the first electrode 50 provided between the branches 17 and 18 is accessible from the entire edge 3 and also from an adjacent fraction of each of the main faces 1 and 2. The other electrode 60 is placed outside the branches 17 and 18, and also outside the core 16. It is accessible simultaneously from both main faces 1 and 2, and also from the edge 4.

It should be observed that the extruded elements shown in FIGS. 1 to 4 are preferably used in association with electrically insulating separators, e.g. based on bare plastics film or on metallized film whose metallization is on its electrode side, whereas the extruded elements shown in FIGS. 5 to 8 do not require the use of such electrically insulating separators. Nevertheless, the extruded elements shown in FIGS. 5 to 8 could be separated by conductive films.

FIG. 9 is a diagram showing the structure of electrochemical assemblies of the kind that the invention sets out to provide.

In FIG. 9, there can be seen an ionic conductor polymer electrolyte film 10 sandwiched between two electrodes, e.g. an anode 70, preferably based on lithium, and a cathode 80, preferably made of a composite material. The cathode 80 is itself in contact with a sheet of metal 90 or with the metallization on a metallized film. The anode 70 may make contact in similar manner with a sheet of metal or with a metallized film. However, because of the good conductivity properties of the anode 70, it may merely be placed in contact with a film 92 that is not conductive.

In the context of the invention, the total thickness of the multilayer structure 92, 70, 10, 80, 90 preferably lies in the range 100 μm to 500 μm.

This structure can be obtained using numerous assembly processes, of which the following four processes may be mentioned in particular:

a) extruding the cathode 80 on the metallized support film 90, followed by extruding the electrolyte 10 on said assembly 80, 90;

extruding the lithium anode 70 on the support film 92; and calendaring together the two previously obtained complexes;

b) co-extruding the cathode 80 and the electrolyte 10 on the metallized support film 90;

extruding the lithium anode 70 on the support film 92; and calendaring together the two previously obtained complexes;

c) extruding the cathode 80 on the metallized support film 90;

co-extruding the lithium anode 70 and the electrolyte 10 on the support film 92; and calendaring together the two previously obtained complexes; and d) co-extruding the composite material cathode 80, the electrolyte 10, and the lithium anode 70 on the metallized support film 90 or on the support film 92; and calendaring said assembly on a support film 92 or on a metallized support film 90.

If the final structure is calendared, the calendaring is preferably performed cold. This disposition makes it easy to wind the lithium anode 70.

As mentioned above and as shown in FIG. 10, in the context of the invention, the assembly step consists in spiral winding a complex based on the extruded element and having the electrolyte layer together with two electrodes such as a cathode and an anode, and preferably also together with sheets of metal or sheets of metallized plastics material.

A plurality of variant electrochemical assemblies obtained by spiral winding as shown in FIGS. 11 to 17 are now described.

The assembly shown in FIGS. 11a and 11b are obtained by assembling together two extruded complexes having the profile of FIG. 1. The electrolytes 10 of the two complexes are placed back-to-back such that the anode 70 and the cathode 80 are accessible from opposite edges of the winding. Respective metallized films 92 and 90 are deposited on the outsides of the anode 70 and of the cathode 80. The films 92 and 90, where the non conductive support film 92 can be provided with a metallized covering, cover the corresponding anode 70 and cathode 80 in full. They are extended over the electrolyte 10 by means of respective electrically insulating marginal strips 93 and 91 of film.

The assembly shown in FIGS. 12a and 12b are obtained by assembling together two extruded complexes corresponding to the profile of FIG. 2. The electrolytes 10 of the two complexes are back-to-back so that the anode 70 and the cathode 80 are placed on opposite faces of the winding. Respective metallized films 92 and 90 are deposited on the outsides of the anode 70 and of the cathode 80. The metallized films 92 and 90 cover the anode 70 and the cathode 80 in full, and they also cover respective marginal zones of the electrolytes adjacent to the opposite edges. The films are extended over the other marginal zones of the electrolyte 10 in the form of electrically insulating strips of film 93 and 91. Thus, if the electrically insulating marginal strip 93 is adjacent to one of the edges of the winding, then the other electrically insulating marginal strip 91 is adjacent to the other edge.

The assembly shown in FIGS. 13a and 13b are obtained by means of an extruded complex having the profile of FIG. 3. Respective metallized films 92 and 90 are deposited on the outsides of the anode 70 and of the cathode 80. The metallized films 92 and 90 respectively cover the anode 70 and the cathode 80 in full. The films are extended over the electrolyte 10 in the form of respective electrically insulating marginal strips of film 93 and 91.

The assembly shown in FIGS. 14a and 14b are obtained by assembling together two extruded complexes corresponding to the profile of FIG. 3. One of the electrodes 50 of a first complex is placed in contact with the electrode 50 of the same kind belonging to the second complex such that the anode 70 and the cathode 80 are accessible from opposite edges of the winding. A metallized film 92, 90 is deposited on the outside of the second electrode. The metallized film 92, 90 covers said second electrode in full. It is extended over the electrolyte 10 by respective electrically insulating marginal strips of film 93 and 91.

The assembly shown in FIGS. 15a and 15b are obtained by means of an extruded complex corresponding to the profile of FIG. 4. Respective metallized films 92 and 90 are deposited on the outsides of the anode 70 and of the cathode 80. The metallized films 92 and 90 respectively cover the anode 70 and the cathode 80 in full. The films are extended over the electrolyte 10 by respective electrically insulating marginal strips of film 93 and 91.

The assembly shown in FIGS. 16a and 16b are obtained by means of an extruded complex corresponding to the profile of FIG. 6. Two metallized films 92 and 90 are deposited on the outside electrode. The metallized films 92 and 90 cover the outside electrode in full. Over the electrolyte 10, they are extended by respective electrically insulating marginal strips of film 93 and 91.

Figure 17A:
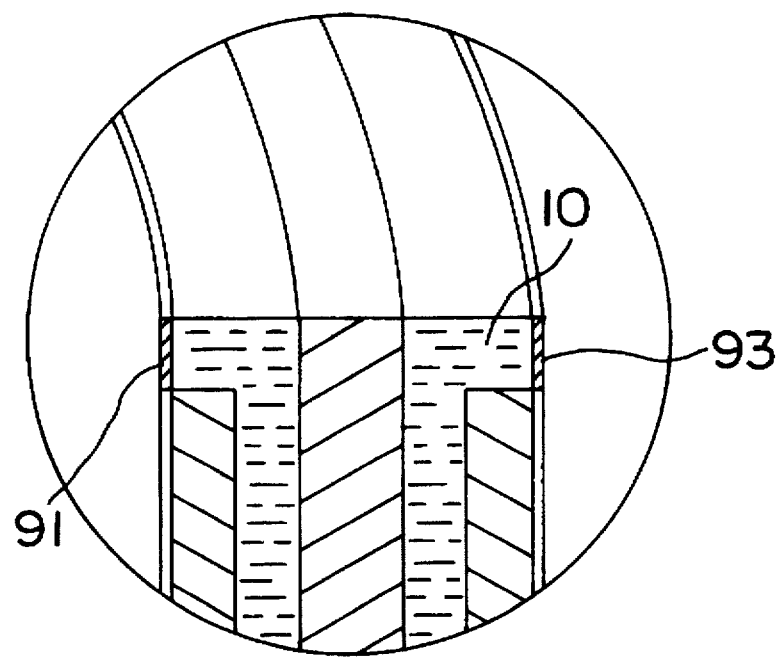
Figure 17B:
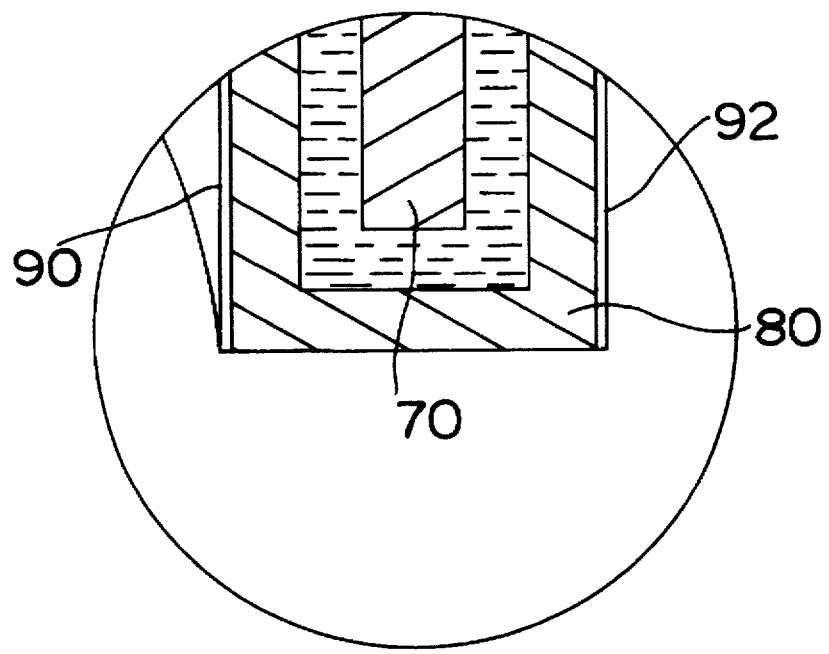

The assembly shown in FIGS. 17a and 17b are obtained by means of an extruded complex corresponding to the profile of FIG. 5. Two metallized films 92 and 90 are deposited on the outside electrode. The metallized films 92 and 90 cover the outside electrode in full. Over the electrolyte 10, they are extended by respective electrically insulating marginal strips of film 93 and 91.

Where necessary, the cylindrical unit cells obtained by spiral winding the assembly can be compressed and considered as disks.

Electrical connections are made via the edges of the windings by depositing a molten phase of metal or metal alloy having a low melting point and good electrical conductivity. This may be done by means of an electric spray gun (implementing a Schoop-like process).

The metallized films 90 are preferably polypropylene films having a thickness of 15 μm to 25 μm and they are coated with nickel having a thickness of 20 nm to 100 nm with deposition being performed by an electron gun or by evaporation due to the Joule effect.

The non-metallized films 92 are preferably polypropylene films having a thickness of 15 μm to 25 μm.

The lithium electrode may be made by cold calendaring, by spreading on lithium in the liquid phase, or by vacuum deposition.

Various particular and non-limiting embodiments of electrochemical assemblies of the present invention are described below.

EXAMPLE 1

This first example consists initially in co-extruding the electrolyte 10 and the cathode 80 using the profile of FIG. 1 and the following compositions:

cathode composition:
  $MnO_2$ 72% by weight
  amorphous C 7% by weight
  ethylene polyoxide 9% by weight
  polyethylene glycol 6% by weight
  $LiCF_3SO_3$ 3% by weight electrolyte composition:
  ethylene polyoxide 85% by weight
  polyolefin wax 5% by weight
  $LiCF_3SO_3$ 10% by weight The assembly 10/80 obtained in this way had its cathode side 80 deposited on a sheet 90 of polypropylene metallized with nickel 100 and having a 5 mm wide non-metallized margin 102 adjacent to the electrolyte, as can be seen in FIG. 18A.

In parallel, a sheet of rolled lithium was prepared to form the anode 70. To do this, a 300 μm thick lithium tape is preferably reduced to a thickness of 100 μm by cold rolling between two polypropylene spacers 104 that are 100 μm thick and 5 mm wide.

After the rolled lithium sheet 70 had been deposited over the electrolyte 10 of the initially bi-extruded assembly 10/80, the resulting complex was calendared, with one of the spacers 104 being retained and with a polypropylene film 92 being placed on the lithium anode 70, as can be seen in FIG. 18B.

The spacer 104 was positioned in such a manner that the anode 70 and the cathode 80 were accessible from different edges.

After calendaring, the complex 92, 70, 10, 80, 100, 90 was spiral wound and two nickel connections were deposited on each end or edge of the winding by deposition using an electric spray gun.

EXAMPLE 2

The second example consists initially in co-extruding the electrolyte 10 and the cathode 80 with the profile of FIG. 1 and having the following compositions:

cathode composition:
  $MnO_2$ 78% by weight
  C 4% by weight
  graphite 1% by weight
  PM 600,000 ethylene polyoxide 6% by weight
  polyethylene glycol 6% by weight
  $LiCF_3SO_3$ 5% by weight electrolyte composition:
  ethylene polyoxide 75% by weight
  polyolefin wax 5% by weight
  $LiCF_3SO_3$ 10% by weight
  MgO 10% by weight This first complex comprising the cathode 80 and the electrolyte 10 was deposited on a stainless metal sheet 90, e.g. made of nickel, having a thickness of 5 μm, as shown in FIG. 19A.

In parallel, and as shown in FIG. 19B, a two-layer assembly comprising a lithium anode 70 and the electrolyte 10 having the profile of FIG. 1 was also made. That assembly is preferably made by cold extrusion. The anode side 70 of this assembly 10, 70 was then deposited on a film 92 of metal-coated polypropylene having a thickness of 12 μm. After the electrolytes 10 of the two complexes had been juxtaposed, as shown in FIG. 19C, so that the lithium anode 70 and the cathode 80 were available via opposite edges, the complexes were calendared together.

Thereafter the assembly was spiral wound and electrical connections were made on the edges thereof, as in Example 1.

EXAMPLE 3

The third example consists initially in making a three-layer co-extrusion of cathode 80, electrolyte 10, and anode 70, having the profile of FIG. 3, and as shown in FIG. 20, the compositions were as follows:

cathode composition:
  $MnO_2$ 77% by weight
  amorphous C 7.5% by weight
  ethylene polyoxide 9% by weight
  polyethylene glycol 3.5% by weight
  $LiBF_3$ 3% by weight electrolyte composition:
  ethylene polyoxide 75% by weight
  polyolefin wax 5% by weight
  $LiBF_3$ 20% by weight anode composition:
  CxLi compound 64% by weight amorphous C 10% by weight
  100,000 ethylene polyoxide 13% by weight
  polyethylene glycol 9% by weight
  $LiBF_4$ 4% by weight The cathode side 80 of the above extruded three-layer complex 70, 10, 80 was deposited on a polyethylene film 90 metallized at 100 with a layer of stainless metal or metal alloy, e.g. nickel or stainless steel, leaving a margin 102 on the electrolyte side. The complex was then spiral wound and electrical connections were made on the edges of the winding, as in Example 1.

The above examples relate to manufacturing an electric battery cell.

There now follows the description of two examples relating to the manufacture of supercapacitors.

In the following two examples, the two electrodes on opposite sides of the electrolyte 10 are identical in kind.

EXAMPLE 4

Figure 21A:
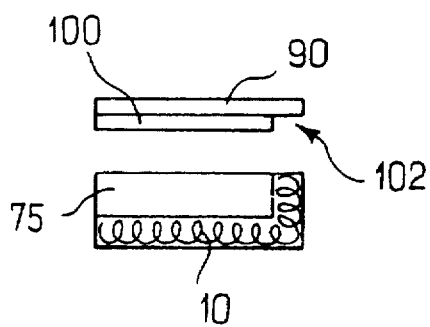
FIGS. 21A and 21B show two intermediate steps in the manufacture of an assembly in a fourth example of the invention.

The fourth example consists initially in making a two-layer extrusion comprising an electrolyte layer 10 having the same composition as Example 1, on an electrode layer 75 having the following composition, with the profile being as shown in FIG. 1:

amorphous C 10% by weight
high specific area C 30% by weight
ethylene polyoxide 40% by weight
polyethylene glycol 10% by weight
$LiCF_3SO_3$ 10% by weight The electrode side 75 of the resulting extruded two-layer complex 10, 75 was deposited on a film 90 of polypropylene metallized with nickel 100 and leaving a 5 mm wide margin 102 on the electrolyte side, as can be seen in FIG. 21A.

Figure 21B:
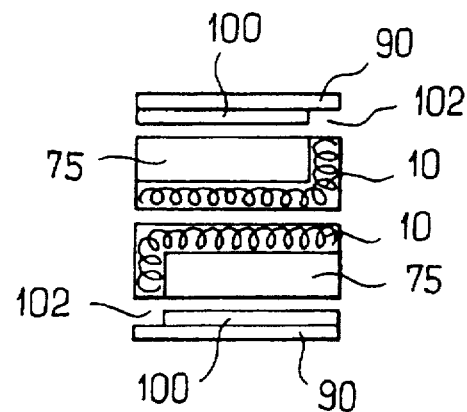

Thereafter, as shown in FIG. 21B, two complexes were placed back-to-back (electrolyte 10 against electrolyte 10) such that the electrodes 75 were accessible via opposite edges, and the resulting assembly was calendared and spiral wound.

Connections were made thereto in the same manner as in Example 1.

EXAMPLE 5

The fifth example consists initially in making a three-layer extrusion comprising an electrode 75, an electrolyte 10, and an electrode 75 with the profile of FIG. 3, and having the following compositions:

electrode composition:
amorphous C 15% by weight
high specific area C 35% by weight
binder (ethylene polyoxide 48% by weight or PVDF)
processing aid 2% by weight electrolyte composition:
ethylene polyoxide 100%

Figure 22:
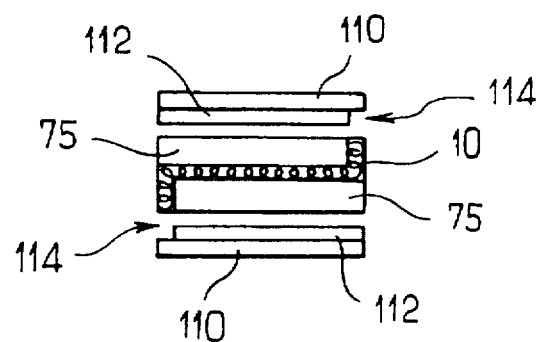
FIG. 22 shows an intermediate step in the manufacture of an assembly in a fifth example of the invention.

As shown in FIG. 22, the extruded three-layer complex 75, 10, 75 is deposited between two films 110 of polyethylene or polypropylene metal-coated with stainless steel or nickel 112, leaving a margin 114 on the electrolyte side.

The assembly was calendared and spiral wound.

Electrical connections were made as in Example 1.

Preferably, prior to being insulated in a package or a block of resin, the elements are impregnated with an organic solvent in which a salt has been dissolved, a propylene carbonate solvent and a salt such as lithium bi (trifluoro sulfonate) imide constituting 45% by weight.

The variant implementation shown in diagrammatic form in FIGS. 23 and 24 is now described.

In this variant, the method of the present invention includes a first step which consists in preparing an electrode 80, a cathode or an anode, by calendaring CAST extrusion. Such a CAST extrusion process consists in receiving the extruded material at the outlet from the die on a support, preferably a heated support, that is adapted to enable the extruded material to be stretched.

In FIG. 23, overall reference 200 designates the extruder for the electrode 80.

At the outlet from the extruder 200, the electrode film 80 is preferably protected over both its main faces by two protective sheets 210 and 212, or by a protective sheet 210 and by a current collector 212.

The protective sheets 210 and 212 are preferably made of polyester. The sheet that is used as a current collector is preferably made of a metallized plastics sheet.

The electrode 80 protected in this way by the sheets 210 and 212 is then preferably subjected to a calendaring operation in a calendaring station 220, with one or both of the cylinders of the calendaring station 220 being heated to a temperature in the range 30° C. to 50° C. The calendaring operation can be implemented in one or more steps. It is preferably adapted to obtain a thin film electrode 80 whose thickness lies in the range 170 µm to 40 µm.

In this variant, the second step consists, after removing the protective sheets 210 and 212 as shown diagrammatically in FIG. 24, in partially coating the electrode 80 with electrolyte 10, in an extrusion operation that takes place through a die that is represented at reference 230 in FIG. 24.

Naturally, when one of the sheets 210 and 212 constitutes a current collector, then the current collector sheet is kept on the electrode 80 as it passes through the die 230.

FIG. 25 is a section view of the assembly obtained at the outlet from the die 230, with the electrolyte 10 being represented as being L-shaped, in a manner comparable to FIG. 1. This disposition should nevertheless not be considered as being limiting. In practice, this variant implementation as shown in FIGS. 23 and 24 can be used to form an electrolyte with any of the shapes described above and shown in the preceding figures.

The second electrode 70, an anode or a cathode, may be deposited on the assembly obtained at the outlet from the die 230 by any appropriate means. For example, the second electrode 70 may be co-extruded with the electrolyte 10 in the die 230, or it may be made separately and be deposited on the complex 10, 80 as described above.

Naturally, the present invention is not limited to the particular embodiments described above, but extends to any variant that comes within the spirit of the invention.

Compared with the state of the art, the present invention offers the following advantages, in particular:

it enables multilayer electrochemical assemblies to be made using a number of steps that is smaller than in prior techniques; this in turn makes it possible to reduce manufacturing costs and to increase reliability, in particular by limiting any risk of pollution;

it avoids the use of solvents and of a drying step, thereby providing considerable economic and ecological advantage;

it makes it possible to avoid chemically deteriorating the lithium;

it serves to provide complete electrochemical assemblies on a manufacturing line that is short and disposed directly at the outlet from the extruder;

it serves to improve the interfaces between the various layers of the electrochemical assemblies;

it can be used for making electrochemical battery cells or supercapacitors, at will;

it is easy to adapt the width of the assemblies made to comply with any particular set of requirements;

it enables good industrial reproducibility to be achieved; and the thicknesses of the various layers used and the uniformity thereof can be controlled accurately.

In addition, depending on the application under consideration, it is naturally possible to connect a plurality of the above-described assemblies in parallel or in series.

What is claimed is:

1. A method of manufacturing a multilayer electrochemical assembly, comprising the-following steps:

extruding an element comprising at least one electrode film and an electrolyte film based on an ionic conductor polymer, the extrusion being through a die shaped in such a manner that the electrode is accessible from at least one main face of-the extruded element and from no more than one of the edges of said element;

spiral winding a complex based on the above-specified extruded element, the complex comprising the electrolyte layer plus two electrodes, disposed on respective opposite sides of the electrolyte, to form a structure having, on different edge faces thereof, means for making electrical contact with respective ones of the two electrodes; and metallizing said edge faces of the structure.

2. A method according to claim 1, wherein one of the electrodes forms an anode while the other electrode forms a cathode, and the electrochemical assembly constitutes an electrical battery cell.

3. A method according to claim 1, wherein both electrodes are of the same kind, and the electrochemical assembly constitutes a supercapacitor.

4. A method according to claim 1, consisting in co-extruding the electrolyte film with an adjacent electrode in the form of a two-layer complex.

5. A method according to claim 1, consisting in co-extruding the electrolyte film with two electrodes respectively adjacent thereto, thereby forming a three-layer complex.

6. A method according to claim 1, consisting in using bi-extrusion to form an electrolyte film having an L-shaped profile that covers one of the main faces of the extruded sheet in full and that covers one of the two edges thereof in full, thereby extending along a margin of the second main face, the co-extruded electrode being accessible from a fraction of the second main face and from a fraction of the second edge of the sheet.

7. A method according to claim 1, consisting in using bi-extrusion to make an electrolyte film having a U-shaped profile that covers one of the main faces of the extruded sheet in full and that covers both edges thereof in full, the co-extruded electrode being accessible from a fraction of the second main face between the electrolyte margins.

8. A method according to claim 1, consisting in using tri-extrusion to make an electrolyte film comprising an internal core extending over the entire width of the extruded sheet and possessing extensions at its respective ends that cover the respective edges in part and that extend along respective margins of the main faces of the extruded sheet, the electrode layers being disposed on respective opposite sides of the internal core and thus being accessible from a fraction of the first and second main faces, and also from a fraction of the edges of the extruded sheet.

9. A method according to claim 1, consisting in using tri-extrusion to make an electrode film having an H-shaped profile, possessing an internal core which extends across the entire width of the extruded sheet and which possesses extensions at its respective ends that completely overlie the respective edges, and that extend to respective margins in both of the main faces, the electrode layers being disposed on respective opposite sides of the internal core and each being accessible from a fraction a respective one of the first and second main faces between the extensions of the electrolyte.

10. A method according to claim 1, consisting in using tri-extrusion to make an electrolyte film having a U-shaped profile possessing a core which extends perpendicularly to the main faces of the extruded sheet, and two mutually parallel branches which are parallel to the main faces while being set back therefrom, the free ends of the branches distant from the core being provided with outwardly directed extensions that are accessible from the main faces, and the two electrodes being placed respectively inside the space defined between the branches and on the outsides of the branches so as to be accessible respectively from different edges of the extruded sheet.

11. A method according to claim 10, wherein the core of the electrolyte layer is accessible from one of the edges of the extruded sheet.

12. A method according to claim 10, wherein the core of the electrolyte is set back from the edge of the extruded sheet.

13. A method according to claim 10, wherein the extensions are accessible from the second edge of the extruded sheet.

14. A method according to claim 10, wherein the extensions are set back from the second edge of the extruded sheet.

15. A method according to claim 6, wherein an electrically insulating separator is interposed between two adjacent complexes.

16. A method according to claim 10, wherein at least two complexes are pressed together without having an interposed electrically insulating separator.

17. A method according to claim 1, wherein the electrolyte film comprises a polymer material associated with a lithium salt.

18. A method according to claim 17, wherein the lithium salt is associated with the polymer material by mixing or by grafting.

19. A method according to claim 17, wherein the electrolyte film further includes a wax acting as a sliding agent, as a flame retarding agent, and a charge dispersion agent, and/or as an agent for facilitating extrusion.

20. A method according to claim 19, wherein the wax is selected from the group comprising polyolefins, and amides.

21. A method according to claim 1, wherein one of the electrodes is constituted by an anode based on lithium.

22. A method according to claim 21, wherein the lithium anode is extruded.

23. A method according to claim 21, wherein the lithium anode is made by cold calendaring, by spreading in the liquid phase, or by vacuum deposition.

24. A method according to claim 1, wherein one of the electrodes is constituted by a cathode in contact with a sheet of metal associated with an insulating sheet, or a metallized film or a metal layer associated with an insulating sheet.

25. A method according to claim 1, wherein one of the electrodes is constituted by an anode in contact with a metal sheet associated with an insulating sheet or a metallized film or a metal layer associated with an insulating sheet.

26. A method according to claim 1, wherein one of the electrodes is constituted by an anode in contact with a non-conductive film.

27. A method according to claim 1, wherein the complex comprising an electrolyte film associated with two electrodes and provided, where appropriate, with metallized or metal sheets, has a thickness lying in the range 100 µm to 500 µm.

28. A method according to claim 1, wherein the complex is calendared.

29. A method according to claim 28, wherein the complex is calendared while cold.

30. A method according to claim 1, further comprising spiral winding two respective co-extruded two-layer symmetrical complexes, by placing their electrolyte layers back-to-back so that the two electrodes are accessible from opposite faces and/or edges of the assembly.

31. A method according to claim 6, further comprising spiral winding two respective co-extruded two-layer symmetrical complexes, by placing their electrolyte layers back-to-back so that the two electrodes are accessible from opposite faces and/or edges of the assembly.

32. A method according to claim 7, further comprising spiral winding two respective co-extruded two-layer symmetrical complexes, by placing their electrolyte layers back-to-back so that the two electrodes are accessible from opposite faces and/or edges of the assembly.

33. A method according to claim 1, further comprising spiral winding two symmetrical two-layer complexes, by placing two same-nature electrode layers side by side.

34. A method according to claim 8, further comprising winding two symmetrical two-layer complexes, by placing two same-nature electrode layers side by side.

35. A method according to claim 1, wherein an electrically conductive sheet including at least one marginal border of electrically insulating material is deposited on each main face of the complex before it is spiral wound.

36. A method according to claim 1, comprising the following steps:
   extruding a cathode on a metal-covered support film, and then extruding the electrolyte on said assembly;
   extruding a lithium anode on a support film; and
   calendaring together the two complexes as obtained above.

37. A method according to claim 1, comprising the following steps:
   co-extruding a cathode and an electrolyte on a metallized support film;
   extruding a lithium anode on a support film; and
   calendaring together the two complexes as obtained above.

38. A method according to claim 1, comprising the following steps:
   extruding a cathode on a metal-covered support film;
   co-extruding a lithium anode and the electrolyte on a support film; and
   calendaring together the two resulting complexes.

39. A method coring to claim 1, comprising the following steps:
   co-extruding a cathode of composite material, the electrolyte, and a lithium anode on the support film or a metallized support film; and
   calendaring said assembly onto a support film or a metallized support film.

40. A method according to claim 1, comprising the following steps:
   preparing an electrode by means of CAST extrusion with both main faces of the electrode being protected at the outlet from the extruder by two protective sheets or by one protective sheet and a current collector; and
   extruding the electrolyte onto the resulting assembly, after removing any protective sheets therefrom.

41. A method according to claim 40, wherein the protective sheets are made of polyester.

42. A method according to claim 40, further comprising the operation of calendaring the protective electrode before extruding the electrolyte.

43. A method according to claim 40, wherein the second electrode is deposited on the assembly obtained after extrusion of the electrolyte, such deposition being by co-extrusion with said electrolyte or by depositing the second electrolyte separately.

44. A method according to claim 1, further including the step that consists in crushing the resulting spiral windings into the form of disks.

45. A method according to claim 1, wherein the electrical connections on the edges of the structure are obtained by depositing a molten phase of low melting point metal or metal alloy.

46. A method according to claim 19, wherein the wax comprises at least one of an amorphous ethylene terpolymer and a low viscosity polyethylene.

47. A method according to claim 45, wherein the electrical connections on the edges of the structure are obtained by deposition using an electric spray gun.

* * * * *

UNITED STATES PATENT AND TRADEMARK OFFICE
CERTIFICATE OF CORRECTION

PATENT NO. : 5,593,462
DATED : January 14, 1997
INVENTOR(S) : Gueguen et al.

It is certified that error appears in the above-identified patent and that said Letters Patent is hereby corrected as shown below:

In column 8 at line 4, please start a new paragraph with the word " After ".

In column 8 at line 29, please start a new line with the word " amorphous ".

In column 8 at line 36, please insert a space after " 100 ".

In column 8 at line 38, please start a new paragraph with the phrase " The complex ".

In column 12, claim 34 at line 62, please delete " winding " and insert -- spiral winding --.

Signed and Sealed this

Seventh Day of October, 1997

Attest:

BRUCE LEHMAN

Attesting Officer

Commissioner of Patents and Trademarks